Sept. 21, 1948.　　　　E. B. ISAAC ET AL　　　　2,449,653
FILAMENT FORMING APPARATUS
Filed July 27, 1946　　　　　　　　　　　　4 Sheets-Sheet 1
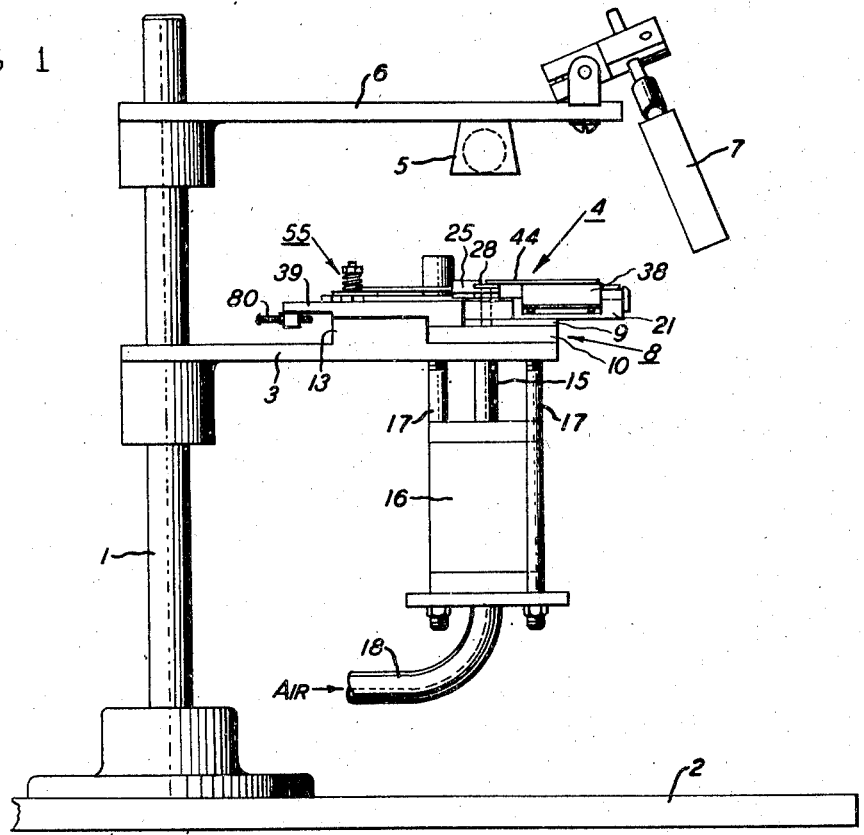
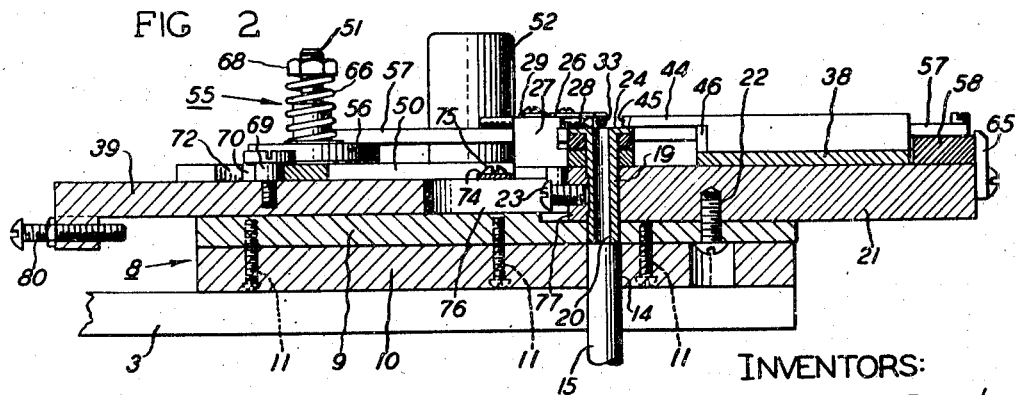
INVENTORS:
ELMER B. ISAAC, DEC'D,
DOROTHY J. ISAAC, ADM'X,
FRANCIS J. RIPPL,
BY John H Anderson
　　THEIR ATTORNEY.

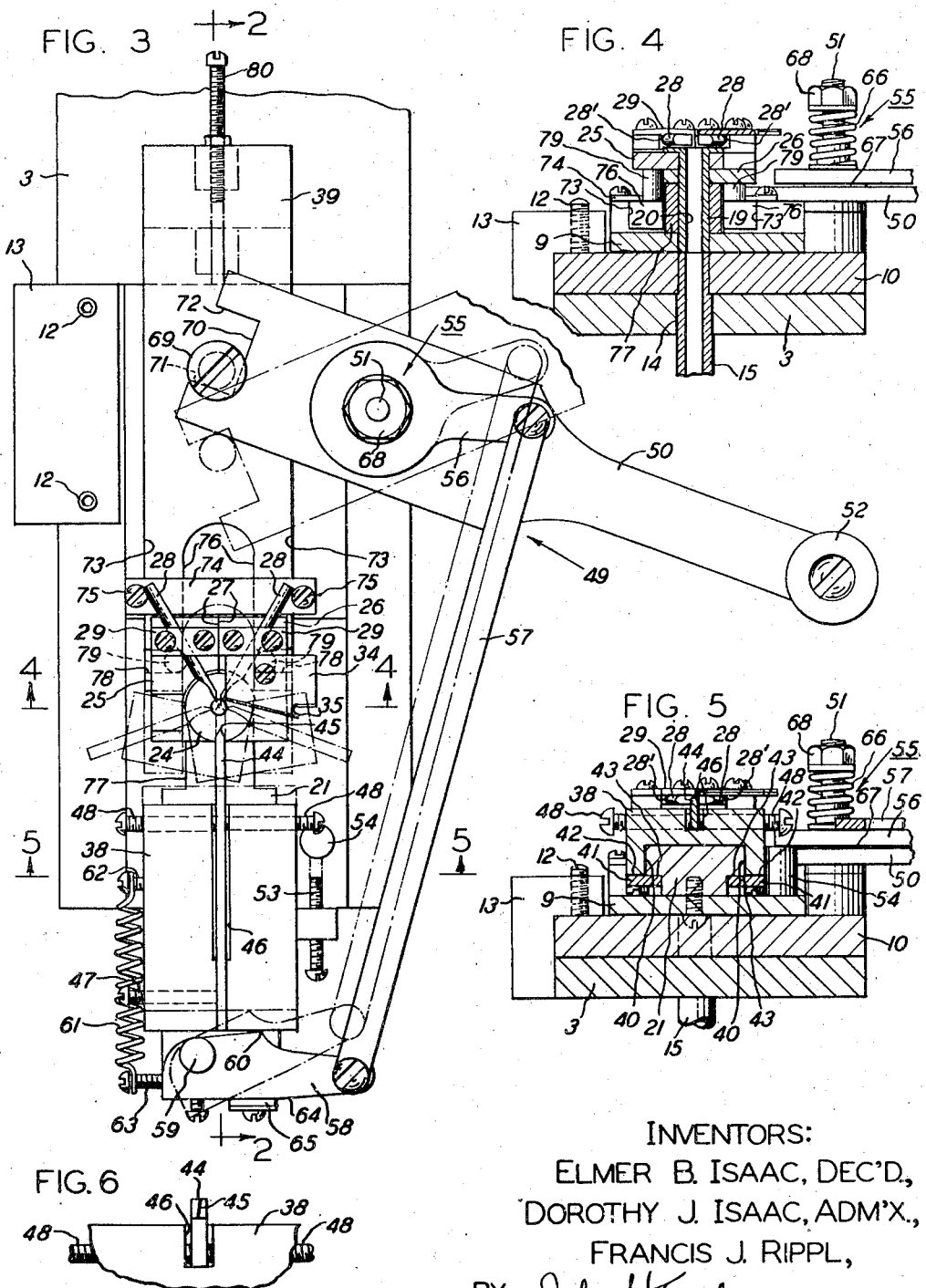

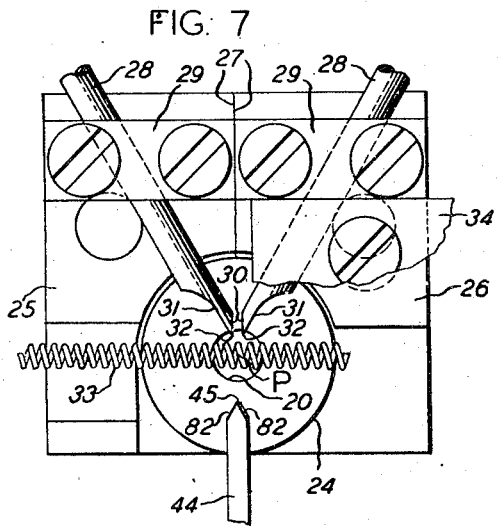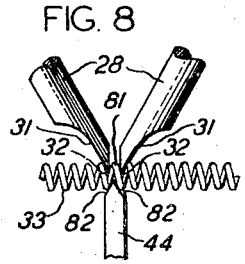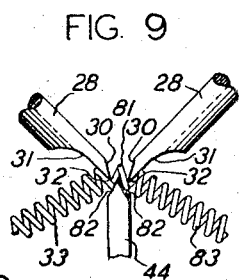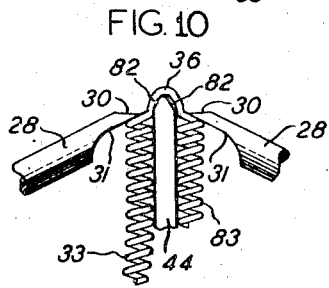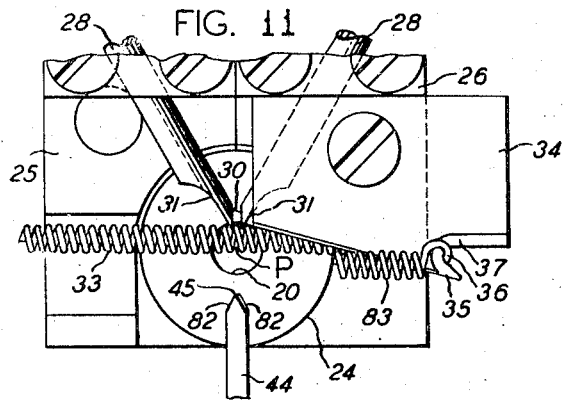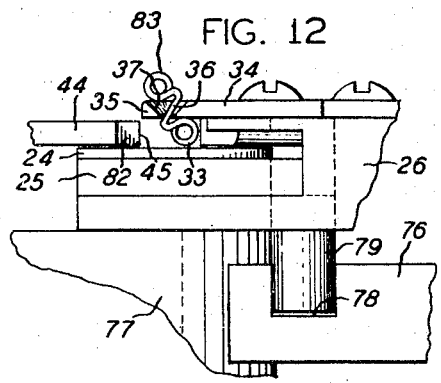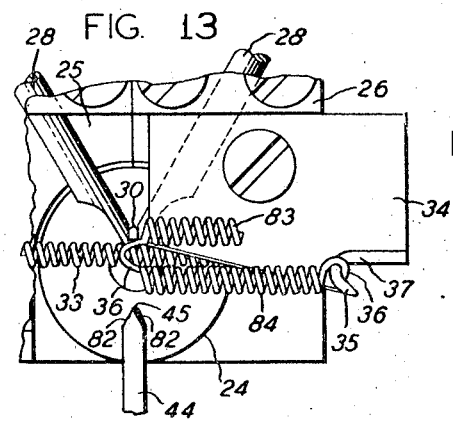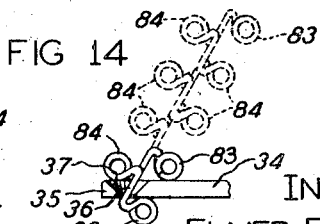
INVENTORS:
ELMER B. ISAAC, DEC'D,
DOROTHY J. ISAAC, ADM'X.,
FRANCIS J. RIPPL,
BY John H Anderson
THEIR ATTORNEY.

Sept. 21, 1948. E. B. ISAAC ET AL 2,449,653
FILAMENT FORMING APPARATUS
Filed July 27, 1946 4 Sheets-Sheet 4
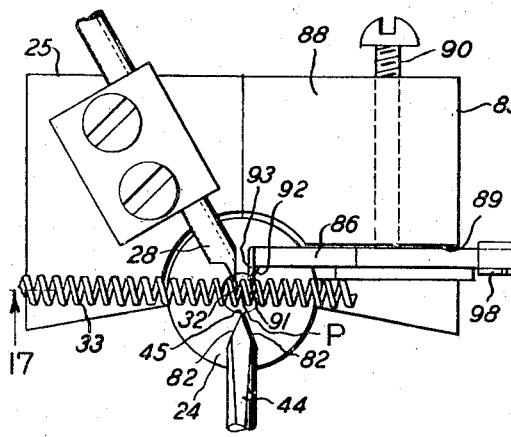
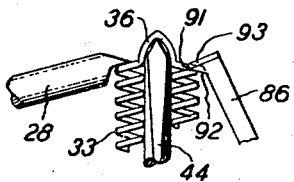
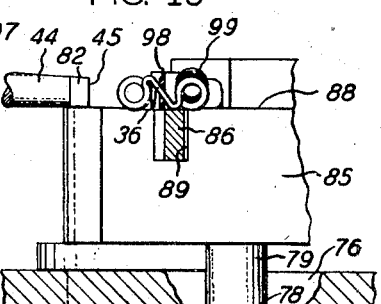
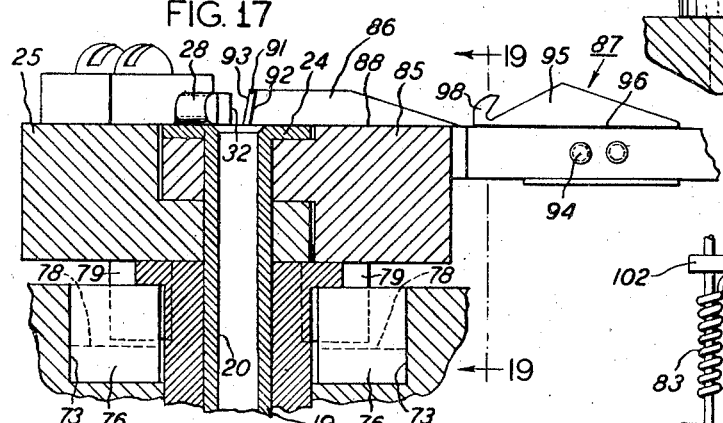
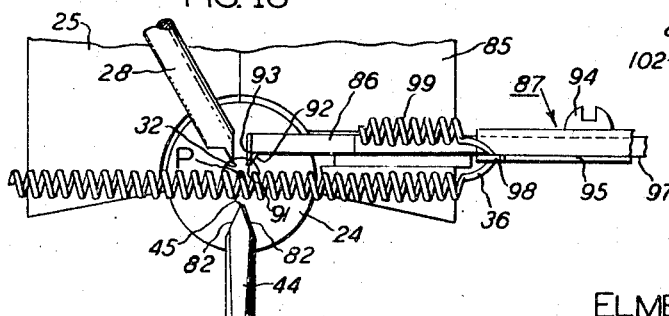
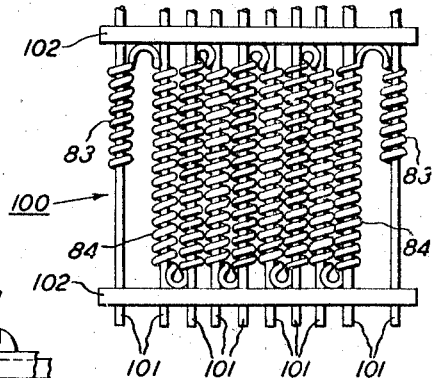
INVENTORS:
ELMER B. ISAAC, DEC'D.,
DOROTHY J. ISAAC, ADM'X.,
FRANCIS J. RIPPL,
BY John H Anderson
THEIR ATTORNEY Patented Sept. 21, 1948

2,449,653

UNITED STATES PATENT OFFICE 2,449,653

FILAMENT FORMING APPARATUS

Elmer B. Isaac, deceased, late of University Heights, Ohio, by Dorothy J. Isaac, administratrix, University Heights, and Francis J. Rippl, Cleveland, Ohio, assignors to General Electric Company, a corporation of New York Application July 27, 1946, Serial No. 686,656

17 Claims. (Cl. 153—2)

Our invention relates, in general, to apparatus for shaping filaments for electric incandescent lamps or similar devices, and more particularly to apparatus for shaping filaments of the monoplane and biplane type such as are used in projection and other high-wattage lamps.

Filaments of the above mentioned planar type comprise a coiled length of filament wire bent into a plurality of side-by-side segments arranged either in a single row or plane in the case of a monoplane filament, or staggered in two closely-adjacent parallel rows or planes in the case of a biplane filament. Heretofore, the shaping of such type filaments has been primarily a hand operation, the operator progressively bending a coiled length of filament wire, at the proper points therealong, around a heated resistance wire and then adjusting the coil segments, as they are thus formed, to their proper position relative to the other segments previously formed. Obviously such hand shaping of the filaments is a very slow and tedious operation which requires the services of a highly skilled operator and which therefore renders the manufacture of such type filaments rather expensive. Moreover, filaments so hand formed do not possess the uniformity in coil placement usually desired in such type filaments.

It is one object, therefore, of the present invention to provide apparatus for mechanically forming planar type filaments for electric incandescent lamps and similar devices.

Another object of our invention is to provide apparatus for mechanically forming such planar type filaments in a quick, simple and accurate manner.

Still another object of our invention is to provide apparatus simple in construction and effective in operation for mechanically and accurately forming planar type lamp filaments which will possess uniform coil placement.

Further objects and advantages of our invention will appear from the following description of species thereof and from the accompanying drawings in which:

Fig. 1 is a side elevation of apparatus comprising our invention for shaping biplane filaments; Fig. 2 is a vertical section of the coil forming unit of the apparatus, the section being taken on the line 2—2 of Fig. 3; Fig. 3 is a plan view of the coil forming unit; Figs. 4 and 5 are transverse sections taken on the lines 4—4 and 5—5, respectively, of Fig. 3; Fig. 6 is an enlarged rear end elevation of the front slide of the coil forming unit and the center blade carried thereby; Fig. 7 is a fragmentary plan view, on an enlarged scale, of the coil forming unit and showing the coil-bending blades in position preparatory to the formation of the first bend in the coil; Figs. 8 to 10 are views illustrating the progressive action of the coil-bending blades in the formation of the first bend in the coil; Fig. 11 is a view similar to Fig. 7 but showing the wire coil in position for the formation of a second bend therein; Fig. 12 is a fragmentary side elevation of Fig. 11; Fig. 13 is a view likewise similar to Fig. 7 but showing the wire coil in position for the formation of the third bend therein; Fig. 14 is a fragmentary end view of the coil-engaging hook and the associated coil in Fig. 13 and showing further, in dotted lines, the position of the coil thereon prior to the formation of the last bend therein; Fig. 15 is a fragmentary plan view, on an enlarged scale, of a modified form of coil forming unit according to the invention for shaping monoplane type filaments and showing the coil-forming blades and the wire coil in position preparatory to the formation of the first bend in the coil; Fig. 16 is a view illustrating the coil-forming blades and the coil of Fig. 15 at the completion of the first bend therein; Fig. 17 is a transverse section taken on the line 17—17 of Fig. 15 but with the wire coil removed for purposes of better illustration; Fig. 18 is a view similar to Fig. 15 but showing the wire coil in position for the formation of the second bend therein; Fig. 19 is a fragmentary side elevation of Fig. 18; and Fig. 20 is a view illustrating a finished biplane filament mounted in position on a jig in readiness for heat treating to set the coil segments in place.

Referring to the drawings, the apparatus according to the invention comprises an upright support column or standard 1 mounted on a table or bench 2 and carrying a bracket 3 on which a filament shaping unit or forming device 4 is mounted. A lamp 5 is supported directly over the forming device 4 in a position to direct light down thereonto and provide adequate illumination of the working area. The lamp 5 is mounted on a bracket 6 which is supported on the column 1 and which also carries a magnifying glass 7 arranged to provide the operator with an enlarged view of the working region of the forming device 4.

The filament forming device 4 comprises an elongated support or base 8 mounted longitudinally on the support bracket 3 and consisting of upper and lower plates 9 and 10, respectively, suitably secured together, as by screws 11. The base 8 is clamped in place on the bracket 3 by means of screws 12, 12 (Fig. 3) in a clamp arm 13 formed on the support bracket 3. The lower base plate 10 is provided with an aperture 14 for snugly receiving a metal tube or pipe 15 which projects from the upper side of the bracket 3. The tube 15 extends down through the bracket 3 and is connected to a suitable heater 16 for supplying heated air or other gas to the filament forming device 4. The air heater 16, which may be of the electric heating coil type, is mounted underneath the bracket 3 and is suitably supported therefrom, as by bolts 17. The air heater 16 is connected by a tube or conduit 18 to a source of air under slight pressure.

The upper base plate 9 is provided with an upstanding headed pivot pin or stud 19 located intermediate the ends of the said plate in vertical alignment with the air tube 15 and having an axial passageway 20 therethrough communicating with the hollow interior of the air tube. The pin 19 extends up through a guide block 21 secured to the upper side of the upper base plate 9 at the front end thereof, as by a screw 22, and the pin 19 is fastened in place in the plate 9 and guide block 21 by a screw 23. At its upper projecting end, the pin 19 is provided with a flat out-turned flange or head 24 which serves as a rest for the wire coil to be shaped. Pivotably mounted on the pin 19, between the flange 24 thereon and the guide block 21, are a pair of holders or pivot members 25, 26 having cooperating vertical side faces 27 which extend radially of the pivot axis of the holders and which abut against one another when the holders are in their normal or starting position as shown in full lines in Fig. 3. The holders 25, 26 are provided with coil-forming fingers preferably in the form of rod-shaped arms or swing blades 28, 28 of hardened steel which extend horizontally and are clamped in channel-shaped recesses 28' (Fig. 4) in the upper faces of the holders by means of clamp plates 29, 29 screwed to the said holders. The swing blades or fingers 28 converge forwardly towards the common pivot axis P (Figs. 7 and 11) of their holders 25, 26, each blade extending at an angle of around 30° or so relative to the longitudinal center line of the base 8 when the holders are in their normal starting position. The forward ends of the swing blades 28 closely overlie the head 24 of the pivot pin 19 and they are pointed by beveling or cutting away one side of each blade, as indicated at 30 (Fig. 7), and forming a flat 31 on the other side thereof. As shown in Fig. 7, the swing blades 28 are set with the points 32 of their wedge-shaped coil-engaging ends located on opposite sides of the longitudinal center line of the forming device passing through the pivot axis of the blades and spaced apart a distance approximately equal to or slightly less than the pitch of the wire coil 33 to be shaped or formed. Secured to and resting flat against the upper side of the right hand holder 26 is a coil-positioning means in the form of a plate 34 the front edge of which is formed with a hook 35 over which the bends or bights 36 formed in the wire coil are progressively hooked (as shown in Figs. 11-14) during the filament forming or shaping operation. The hook plate 34 is mounted on the holder 26 in a manner such that the hook 35 opens to the right when said holder is in its normal starting position. The plate 34 overlies the head 24 on the pivot pin 19 and is spaced upwardly therefrom a distance sufficient to permit the wire coil 33 to be inserted therebetween, as shown in Figs. 11-13. The wall of the hook 35 is flared upwardly and outwardly, as indicated at 37, to provide a positioning seat for the bights 36 of the wire coil 33 which tends to position the successive coil segments in proper staggered relation relative to one another when the bights 36 are pulled tight against said seat during the filament forming operation.

Slidably mounted on the upper base plate 9 to slide longitudinally thereof towards and away from each other are a front slide 38 and a rear slide 39 positioned, respectively, in front of and behind the blade holders 25, 26. The front slide 38 slides on the guide block 21, the latter being formed for such purpose with a T-shape transverse section (Fig. 5) and the slide 38 being provided with a guideway 40 in its underside for receiving the guide block. The slide 38 is held in place on the guide block 21 by means of retaining or way plates 41, 41 which are fastened to the underside 42 of the slide and which overlap the shoulders 43, 43 on the guide block 21 to thus lock the latter in the ways 40.

The slide 38 carries a horizontally extending projection or anvil 44 which projects rearwardly from the slide at the level of and in opposed relation to the fingers or swing blades 28 and around which the wire coil 33 is bent during the filament forming operation. The projecting anvil 44 is preferably formed of hardened steel and is in the form of a thin blade provided with a pointed or wedge-shaped rear end formed by beveling or tapering the sides of the blade to an edge 45 which preferably is inclined at an angle to the vertical corresponding approximately to the pitch of the wire coil 33 to be formed, as shown in Fig. 6. The anvil or wedge blade 44 extends toward the pivot axis P of the swing blade holders 25, 26 in approximate alignment with the longitudinal center line of the forming device which passes through said pivot axis. The wedge blade 44 is secured in place within a slot 46 in the upper side of the slide 38 by means of a fastening screw 47. The blade-receiving slot 46 is widened for a distance back from the rear end of the slide 38 to permit a limited amount of lateral adjustment of the wedge blade 44 therein, adjustment screws 48 being provided for such purpose. The wedge blade 44 is set, by means of the adjusting screws 48, in a position such that the pointed end 45 thereof will lie between the points 32 of the swing blades 28 so as to enter the pitch space of that turn of the wire coil 33 which is caught between the points 32 of the swing blades during the filament forming operation, as shown in Fig. 8.

During the operation of the device, the slide 38 is moved rearwardly within its guideway 40 towards the swing blades 28 by hand-operated slide-actuating means 49 (Fig. 3) comprising a horizontally arranged hand lever 50 extending more or less transversely of the device and pivotally mounted intermediate its ends on an upstanding pivot pin 51 fastened to the base 8 at one side thereof. The actuating lever 50 is provided with a hand knob 52 at its outer end while its inner end overlies the rear slide 39. Rearward swinging movement of the actuating lever 50 advances the front slide 38 from its retracted position (shown in full lines in Fig. 3) to its operative position shown in dash-dot lines, as determined by the engagement of a stop screw 53 carried by the slide with a stop pin 54 fastened to the upper base plate 9. The rearward pivotal movement of the actuating lever 50 is transmitted to the slide 38 through a yielding connection comprising a slip friction clutch 55 which pivots an arm 56 pivotally mounted on the pivot pin 51 and connected by a link 57 to one end of a lever 58 which is pivotally mounted at its other end on a pin 59 upstanding from the guide block 21. The lever 58 is located in front of the slide 38 and is provided with a hump 60 on its rear edge which bears against the front end of the slide. A tension coil spring 61 connected between anchor posts or screws 62, 63 on the slide 38 and guide block 21, respectively, normally holds the said slide in its retracted position as determined by the engagement of the front edge 64 of lever 58 with a stop lug 65 fastened to the guide block.

The slip friction clutch 55, by means of which the arm 56 is coupled to the hand actuating lever 50, comprises a compression coil spring 66 which is fitted over the pivot pin 51 and which bears against and presses the arm 56 downwardly into frictional engagement with a washer 67 of leather or other similar material which is interposed between the said arm 56 and the hand actuating lever 50. The spring 66 is compressed against the arm 56 by an adjustable nut 68 threaded onto the upper end of the pivot pin 51. Due to the frictional grip between the leather washer 67 and the arm 56 and lever 50, the said arm is pivoted along with the lever during the first part of the backward swinging movement of the lever. However, when the stop screw 53 strikes the stop pin 54 to thereby restrain further advance movement of the slide 38, the slip friction clutch or connection 55 permits the hand lever 50 to slip relative to the arm 56 and to be pivoted or swung back a further amount. This further pivotal movement of the hand lever 50 serves to move the rear slide 39 forwardly so as to pivot the blade holders 25, 26 and thus swing the blades 28 to cause them to bend the wire coil 33 around the wedge blade 44.

The delayed action of the lever 50 in actuating the rear slide 39 only after the front slide 38 and the associated wedge blade 44 have been advanced approximately to their forward operative position, is provided by a lost motion connection between the lever 50 and slide 39. As shown in Fig. 3, the said lost motion connection comprises an upstanding pin 69 on the rear slide which is received within a relatively wide notch 70 formed in the inner end of the lever 50. The end walls 71, 72 of the notch 70 provide front and rear shoulders, respectively, for engaging with the pin 69 to move the slide 39. The width of the notch 70, i. e., the distance between the shoulders 71, 72, is made considerably greater than the diameter of the pin 69, the said distance being of such dimension as to effect engagement of the rear shoulder 72 with the pin 69 to thus initiate the forward sliding movement of the rear slide 39 only after, but preferably slightly before the wedge blade 44 reaches its forward or operative position as determined by the engagement of the stop screw 53 with the stop pin 54.

The rear slide 39 is guided in ways 73, 73 formed in the upper side of the upper base plate 9, and it may be held down in place in its guideway by a retaining strap 74 extending across the upper side of the slide and secured to the upper base plate 9, as by screws 75. The forward end of the slide 39 is forked to provide forwardly-extending spaced arms 76, 76 which accommodate therebetween the front end or tongue portion 77 of the guide block 21 when the rear slide is advanced in its guideway. The arms 76 are provided with transverse slots or grooves 78 (Figs. 3 and 12) which receive pins 79 depending from the holders 25, 26. When the rear slide 39 is moved in its guideway, the pins 79, riding in the cross slots 78, will pivot the blade holders 25, 26 and thus swing the blades 28 in unison about their common pivot axis P.

The extent of forward sliding movement of the rear slide 39, and therefore the extent of swinging movement of the blades 28, is controlled to give the desired degree of bend in the wire coil 33. Thus, in the particular case illustrated in the drawings wherein all the segments of the finally shaped filament are to extend parallel to one another, the swing arms 28 are swung through an arc sufficient to swing the portions of the wire coil 33 lying on opposite sides of the wedge blade 44 into substantial parallel relation with each other and to thereafter retain such parallel relation. In order for the coil segments to retain such parallel relation upon withdrawal of the swing arms 28, it is usually necessary to actually overbend the wire coil 33 a slight amount beyond the point where the segments are first swung into parallel relation with one another, in order to compensate for the spring-back tendency of the wire coil. In the particular case illustrated wherein the wire coil 33 is formed of approximately 0.0095" diameter tungsten wire wound into a helix of 0.051" outside diameter having 80 turns per inch, the arc through which the blades 28 are swung, in order for the coil segments to retain their parallel relation, is around 80° or so. The extent of swinging movement of the blades 28 to give the desired degree of bend in the wire coil 33 is controlled by an adjustable stop screw 80 which is carried by the rear slide 39 and which engages the rear end of the upper base plate 9 to limit the forward sliding movement of said slide.

Referring now to Figs. 7–14 illustrating the operation of the forming device in shaping a biplane type filament, the wire coil 33 which is to be shaped is first laid on top the head 24 of pin 19 in a position extending transversely of the forming device and between the blades 28 and 44 and with the required length of the wire coil (8 or so turns in the particular case illustrated) projecting to the right of the anvil or wedge blade 44 to form the desired length of end segment in the finished filament. Then, while the heated air from the heater 16 is flowing up through the bore 20 of the pin 19 so as to heat the overlying turns of the wire coil, the hand lever 50 is swung rearwardly to first catch a turn of the wire coil between the points 32 and 45 of the blades 28 and 44 (as shown in Fig. 8) and then swing the blades or fingers 28 forwardly to the limit of their movement, as determined by the engagement of the stop screw 80 with the upper base plate 9, to thereby bend the wire coil around the wedge blade 44 as shown in Figs. 9 and 10. The preferable setting of the slides 38, 39 whereby the swinging movement of the blades 28 is initiated slightly before the wedge blade 44 reaches the limit of its advance movement, serves to assure sufficient clearance between the points 32, 45 of the blades for the free accommodation of the wire 33 therebetween, thus eliminating binding between the parts. During the course of their swinging movement, the blades or fingers 28 force the turn 81 of the coil caught between the blade points 32 and 45 down onto the tapered or wedge surfaces 82 of the wedge blade which thus act to spread or open up the said turn 81 of the coil and form a connecting loop or bight 36 between the formed parallel segments of the coil.

Following the formation of the first bend in the wire coil 33, the bight 36 thereof is placed on and properly seated in the hook 35, with the unformed portion of the wire coil positioned between the hook plate 34 and the head 24 of pin 19, and with the formed end segment 83 of the wire coil positioned forwardly of the unformed portion thereof, as shown in Figs. 11 and 12. The upwardly beveled seat 37 of the hook 35 tends to naturally position the formed end segment 83 in such forward position relative to the unformed coil portion when the bight 36 is pulled tight against the seat. With the wire coil 33 thus positioned on the hook 35, the hand lever 50 is again swung back in the same manner as before to thereby form the second bend in the coil and the first full segment 84 thereof. The second bight 36 thus formed in the coil is then seated on the hook 35 in the same way as before, with both the end segment 83 and the first full segment 84 positioned above the hook plate 34 and the unformed portion of the wire coil positioned below the said plate, as shown in Figs. 13 and 14. The hand lever 50 is then actuated once again to thereby form the third bend in the wire coil and the second full segment 84 thereof. This operation is then repeated until the desired number of coil segments have been formed, the successive bights 36 being progressively hooked as they are formed on the hook 35 and the formed end segment 83 and full segments 84 of the coil being positioned in each case above the hook plate 34, as indicated in dotted lines in Fig. 14. The original length of the wire coil 33 from which the filament is formed is preferably so selected that the final or back end segment formed by the last bending operation is of a length corresponding substantially to that of the front end segment. However, where the back end segment is of greater length than desired, the excess may be cut off to form the proper length end segment.

The modification illustrated in Figs. 15–19 for shaping monoplane type filaments is similar to that shown in Figs. 1–14 except for the construction of the right-hand blade holder 85 and the blade 86 and hook member 87 carried thereby. The blade holder 85 differs from the holder 26 of the previous form of the invention in that it is provided with a flat unobstructed upper surface 88 level with the upper surface of the head 24 on the pivot pin 19 so as to enable the formed segments of the wire coil to lie flat thereon in the horizontal plane defined by the as yet unformed portion of the wire coil. The holder 85 is formed with a slot 89 in its upper side which, when the holder is in its normal starting position as shown in Fig. 15, extends transversely of the forming device in more or less alignment with the pointed end portion of the swing blade or finger 28 in the left-hand holder 25. The right-hand former or swing blade 86 is received in the slot 89 and is fastened in position therein by a screw 90 threaded into the holder 85. The inner end of the blade or finger 86 is positioned closely adjacent the inner or pointed end 32 of the other swing blade 28 and it is provided with a forwardly extending pointed or wedge-shaped lip 91 which is adapted to enter the space between and engage the turns of the wire coil 33 to be formed. For this purpose, the outwardly facing side wall 92 of the lip 91 is beveled at an angle of around 30° or so relative to the longitudinal center line of the device passing through the pivot axis P of the holders 25, 85, as shown in Fig. 15. In addition, the said outer side wall 92 of the lip 91 and also the inner side wall 93 thereof are preferably inclined at an angle corresponding approximately to the pitch of the wire coil, as shown in Fig. 17.

The horizontally extending swing blade or finger 86 projects outwardly beyond the outer side of the holder 85 and carries, outwardly of the holder, the hook member 87 which may be fastened to the blade 86 by means of a screw 94. The hook member 87 is formed with a thin plate portion 95 upstanding from that portion 96 of the upper side of the blade 86 which lies outwardly beyond the blade holder 85, said upper side portion 96 of the blade lying substantially in the plane of the flat upper side 88 of the holder 85, as shown in Fig. 17. The plate portion 95 of the hook member 87 lies approximately in the plane of the front side 97 of the blade 86. At its inner end, said plate portion 95 has its upper edge formed with a hook 98 which opens laterally outward or to the right, as viewed in Fig. 17, and on which are hooked the bights 36 formed in the wire coil 33.

The operation of the modified form of apparatus shown in Figs. 15–19 is substantially the same as that described in connection with the previous form of the invention, the wire coil 33 being placed between the points 45 and 32, 91 of the blades 44, 28 and 86, and the hand lever 50 being swung back to bend the wire coil around the pointed end of the anvil or wedge blade 44 and form a hook or bight 36 in the coil. As before, the bights 36 are successively hooked, as they are formed, on the hook 98 with the already formed coil segments 99 (Figs. 18 and 19) located in each case to the rear side of the blade 86 and resting on the flat upper surface 88 of the blade holder 85.

After the filaments have been shaped on the forming device 4 they may, if desired, be heat treated to set the coil segments in final definite position relative to one another. For this purpose, the filaments may be mounted in a jig 100 (Fig. 20) comprising a plurality of tungsten rods or mandrels 101 conforming in diameter to the inside coil diameter of the filaments and held by molybdenum spacer plates 102 in the exact position relative to one another (parallel to each other in the particular case illustrated) that the coil segments are to finally occupy when set. The filaments are mounted on the mandrels 101 with the various coil segments of each filament threaded over its corresponding mandrel and separated from the next adjacent filament on the jig by one of the spacer plates 102, each jig being adapted to hold a plurality of filaments (for instance, ten or so) at one time. The tungsten filaments on the jigs are then heat treated to set the coil segments in their jig-held position and thus complete the manufacture of the filaments.

What we claim as new and desire to secure by Letters Patent of the United States is:

1. Apparatus for shaping planar type lamp filaments from coiled wire comprising an anvil, support means for said anvil, a pair of fingers mounted on said support means in opposed relation to the anvil, said fingers and anvil being mounted to receive and grip a turn of the wire coil therebetween with the ends of the fingers and anvil disposed within the coil, said fingers being further mounted for swinging movement around opposite sides of the anvil to bend the wire coil therearound, and coil-positioning means mounted on said support means for swinging movement in unison with one of said fingers and engageable with the bend formed in the wire coil to thereby position the wire coil in definite relation to said fingers and anvil in position for the succeeding bend therein.

2. Apparatus for shaping planar type lamp filaments from coiled wire comprising an anvil, support means for said anvil, a pair of pivotable holders mounted on said support means and carrying fingers disposed in opposed relation to said anvil, said fingers and anvil being mounted to receive and grip a turn of the wire coil therebetween with the ends of the fingers and anvil disposed within the coil, said holders being pivotable about a common axis to swing said fingers around opposite sides of the anvil and thus bend the wire coil therearound, and coil-positioning means carried by one of said holders and engageable with the bend formed in the wire coil to thereby position the wire coil in definite relation to said fingers and anvil in position for the succeeding bend therein.

3. Apparatus for shaping planar type lamp filaments from coiled wire comprising an anvil, support means for said anvil, a pair of pivotable holders mounted on said support means and carrying fingers disposed in opposed relation to said anvil, said fingers and anvil being mounted to receive and grip a turn of the wire coil therebetween with the ends of the fingers and anvil disposed within the coil, said holders being pivotable about a common axis to swing said fingers around opposite sides of the anvil and thus bend the wire coil therearound whereby to spread open said coil turn into a loop, and a hook carried by one of said holders and arranged to receive said loop to thereby position the wire coil in definite relation to said fingers and anvil for the succeeding bend therein.

4. Apparatus for shaping planar type lamp filaments from coiled wire comprising a base member, a pair of pivotable holders mounted on said base member, a pair of slides reciprocably mounted on said base member to slide thereon, an anvil carried by one of said slides, a pair of fingers carried respectively by said holders and disposed in opposed relation to the anvil, said anvil being movable by its supporting slide towards said fingers to grip a turn of the wire coil therebetween with the ends of the fingers and anvil disposed within the coil, said holders being pivotable about a common axis to swing the fingers around opposite sides of the anvil and thus bend the wire coil therearound, the other one of said slides being connected to said holders to simultaneously pivot them, and actuating means operatively connected to said slides for sequentially advancing them to first move the anvil towards the fingers and then pivot the holders to thereby swing the fingers around the anvil and bend the wire coil therearound.

5. Apparatus for shaping planar type lamp filaments from coiled wire comprising a base member, a pair of slides reciprocably mounted on said base member to slide towards and away from each other, a pair of pivotable holders mounted on said base member between said slides, an anvil carried by one of said slides, a pair of fingers carried respectively by said holders and disposed in opposed relation to the anvil, said anvil being movable by its supporting slide towards said fingers to grip a turn of the wire coil therebetween with the ends of the fingers and anvils disposed within the coil, said holders being pivotable about a common axis to swing the fingers around opposite sides of the anvil and thus bend the wire coil therearound, the other one of said slides being connected to said holders to simultaneously pivot them, and common actuating means operatively connected to said slides for sequentially advancing them towards each other to first move the anvil towards the fingers and then pivot the holders to thereby swing the fingers around the anvil and bend the wire coil therearound.

6. Apparatus for shaping planar type lamp filaments from coiled wire comprising an anvil, support means for said anvil, a pivot pin on said support means having an axially extending passageway therethrough, a pair of holders pivoted on said pivot pin and carrying fingers disposed in opposed relation to the anvil, said fingers and anvil being mounted to receive and grip a turn of the wire coil therebetween with the ends of the fingers and anvil disposed within the coil and said coil turn disposed opposite one end of the passageway in the pivot pin, said holders being pivotable on the pivot pin to swing the fingers around opposite sides of the anvil and thus bend the wire coil therearound, and means communicating with the other end of said passageway for directing a current of heated gas therethrough to heat said coil turn.

7. Apparatus for shaping coiled wire into lamp filaments comprising support means, an anvil mounted on said support means and adapted to project into the pitch space in a turn of the wire coil, and a pair of fingers mounted on said support means with coil-engaging ends thereof in normally adjacent side-by-side relation opposite the anvil and adapted to project into respective pitch spaces of successive turns of the wire coil, said fingers and anvil being mounted to receive therebetween a turn of the wire coil with the anvil projecting into the wire coil from one side thereof and within the pitch space of said coil turn and with said fingers projecting into the coil from the opposite side thereof and respectively within the pitch spaces at either side of said coil turn, said fingers being further mounted for pivotal movement about a common axis adjacent their said coil-engaging ends to swing oppositely away from each other and around opposite sides of the anvil to bend the wire coil therearound.

8. Apparatus of the character set forth in claim 7 wherein said anvil is mounted for movement toward the said fingers to catch therebetween a turn of the wire coil.

9. Apparatus for shaping coiled wire into lamp filaments comprising support means, an anvil mounted on said support means and having a wedge-shaped end adapted to project into the pitch space in a turn of the wire coil, and a pair of fingers mounted on said support means and having wedge-shaped ends in normally adjacent side-by-side relation opposite the wedge end of said anvil and adapted to project into respective pitch spaces of successive turns of the wire coil, said fingers and anvil being mounted to receive therebetween a turn of the wire coil with the anvil projecting into the wire coil from one side thereof and within the pitch space of said coil turn and with said fingers projecting into the coil from the opposite side thereof and respectively within the pitch spaces at either side of said coil turn, said fingers being further mounted for pivotal movement about a common axis adjacent their said wedge-shaped ends to swing oppositely away from each other and around opposite sides of the anvil to bend the wire coil therearound.

10. Apparatus for shaping coiled wire into lamp filaments comprising support means, an anvil mounted on said support means and adapted to project into the pitch space in a turn of the wire coil, a pair of pivotable holders mounted on said support means and carrying fingers having coil-engaging ends in normally adjacent side-by-side relation opposite the anvil and adapted to project into respective pitch spaces of successive turns of the wire coil, said fingers and anvil being mounted to receive therebetween a turn of the wire coil with the anvil projecting into the wire coil from one side thereof and within the pitch space of said coil turn and with said fingers projecting into the coil from the opposite side thereof and respectively within the pitch spaces at either side of said coil turn, said holders being pivotable about a common axis adjacent said coil-engaging ends of the fingers to swing said fingers oppositely away from each other and around opposite sides of the anvil to bend the wire coil therearound, and actuating means operatively connected to said holders for simultaneously pivoting them about their said pivot axis to effect said bending of the wire coil around the anvil.

11. Apparatus for shaping coiled wire into lamp filaments comprising support means, an anvil mounted on said support means and adapted to project into the pitch space in a turn of the wire coil, a pair of pivotable holders mounted on said support means and carrying fingers having coil-engaging ends in normally adjacent side-by-side relation opposite the anvil and adapted to project into respective pitch spaces of successive turns of the wire coil, said anvil being movable on said support means toward the fingers to catch therebetween a turn of the wire coil with the anvil projecting into the coil from one side thereof and within the pitch space of said coil turn and with said fingers projecting into the coil from the opposite side thereof and respectively within the pitch spaces at either side of said coil turn, said holders being pivotable about a common axis adjacent the said coil-engaging ends of the fingers to swing said fingers oppositely away from each other and around opposite sides of the anvil to bend the wire coil therearound, and common actuating means operatively connected to both said anvil and said holders and arranged to sequentially actuate first said anvil to move it toward the fingers to catch therebetween a turn of the wire coil and then to pivot said holders simultaneously about their said pivot axis to effect said bending of the wire coil around the anvil.

12. Apparatus for shaping coiled wire into lamp filaments comprising support means, a pair of fingers pivotable on said support means about a common pivot axis and having coil-engaging ends disposed in normal side-by-side relation adjacent the said pivot axis and adapted to project into respective pitch spaces of successive turns of the wire coil, said coil-engaging ends having substantially flat coil-engaging surfaces facing outwardly away from each other and converging approximately toward the said pivot axis, an anvil mounted on said support means in opposed relation to the coil-engaging ends of said fingers to catch therebetween a turn of the wire coil with the anvil and the coil-engaging ends of the fingers projecting into the coil from opposite sides thereof, and actuating means on said support means connected to said fingers for pivoting the fingers about their said pivot axis to swing their coil-engaging ends oppositely away from each other and around opposite sides of the anvil to bend the wire coil therearound.

13. Apparatus for shaping coiled wire into lamp filaments comprising support means, a pair of fingers pivotable on said support means about a common pivot axis and having coil-engaging ends disposed in normal side-by-side relation adjacent said pivot axis and adapted to project into respective pitch spaces of successive turns of the wire coil, said coil-engaging ends having substantially flat coil-engaging surfaces facing outwardly away from each other and converging approximately toward said pivot axis, an anvil mounted on said support means in opposed relation to the coil-engaging ends of said fingers and having a wedge-shaped coil-engaging end adapted to project into the pitch space in a turn of the wire coil, said anvil being movable on said support means in a direction toward said pivot axis to position its wedge end adjacent and approximately at the point of convergence of the coil-engaging surfaces of said fingers whereby to catch a turn of the wire coil between the coil-engaging ends of the anvil and fingers, and actuating means on said support means connected to said fingers for pivoting the fingers about their said pivot axis to swing their coil-engaging ends oppositely away from each other and around opposite sides of the anvil to bend the wire coil therearound.

14. Apparatus for shaping coiled wire into lamp filaments comprising support means, an anvil mounted on said support means, a pair of fingers mounted on said support means in opposed relation to the anvil, said anvil being movable on said support means toward the fingers to catch therebetween a turn of the wire coil with the ends of the fingers and the anvil projecting into the coil from opposite sides thereof, said fingers being further mounted for swinging movement around opposite sides of the anvil to bend the wire coil therearound, an actuating member movably mounted on said support means, means yieldably connecting said actuating member to said anvil for transmitting advance movement of the actuating member to said anvil to advance it toward said fingers, means operatively associated with said anvil for limiting the advance movement thereof during the advance travel of said actuating member, and connection means operatively connecting the actuating member to said fingers for transmitting the advance movement of said actuating member to said fingers to swing them around the anvil only after the anvil has been advanced by the actuating member approximately to its limiting advance position wherein it projects into the wire coil.

15. Apparatus for shaping coiled wire into lamp filaments comprising support means, a slide mounted on said support means for sliding movement thereon, an anvil carried by said slide, a pair of fingers mounted on said support means in opposed relation to the anvil, said anvil being movable by its supporting slide toward said fingers to catch therebetween a turn of the wire coil with the ends of the fingers and the anvil projecting into the coil from opposite sides thereof, said fingers being further mounted for swinging movement around opposite sides of the anvil to bend the wire coil therearound, an actuating member movably mounted on said support means, means including a slip friction clutch connecting said actuating member to said slide for transmitting advance movement of the actuating member to said slide to advance the anvil toward said fingers, stop means on said support means engageable with said slide to limit the advance travel thereof during the advance movement of said actuating member, and connection means operatively connecting the actuating member to said fingers for transmitting the advance movement of said actuating member to said fingers to swing them around the anvil only after the anvil has been advanced by the actuating member approximately to its limiting advance position wherein said slide is in engagement with said stop means.

16. Apparatus for shaping coiled wire into lamp filaments comprising a base member, a pair of holders pivotably mounted on said base member to pivot about a common axis, a front slide reciprocably mounted on said base member to the front side of said holders to slide toward and away therefrom, an anvil carried by and projecting from said front slide toward the said holders and having a coil-engaging end adapted to project into the pitch space of a turn of the wire coil, a pair of fingers carried respectively by said holders and having coil-engaging ends in normal side-by-side relation opposite the coil-engaging end of the anvil and adapted to project into respective pitch spaces of successive turns of the wire coil, said anvil being movable by the front slide toward said fingers to catch therebetween a turn of the wire coil with the coil-engaging ends of the anvil and the fingers projecting into the coil from opposite sides thereof, a rear slide reciprocably mounted on said base member to the rear side of and connected to said holders to simultaneously pivot them about their said pivot axis to swing said fingers around opposite sides of the anvil so as to bend the wire coil therearound, and common actuating means for said slides comprising a lever pivoted on said base member, connection means comprising a slip friction clutch operatively connecting said lever to the front slide for transmitting advance movement of said lever to said front slide to advance the anvil toward the fingers, and a lost-motion connection between said lever and said rear slide for transmitting advance movement of said lever to said rear slide to pivot the holders and swing said fingers around the anvil only after the anvil has been moved by said lever to its advanced position wherein it projects into the wire coil.

17. Apparatus for shaping coiled wire into lamp filaments comprising a base member, separate front and rear slides reciprocably mounted on said base member to slide toward and away from each other, a pair of holders pivotably mounted on said base member between said slides to pivot about a common axis transverse to the path of sliding movement of said slides, an anvil carried by and projecting from the front slide toward the said holders and having a coil-engaging end adapted to project into the pitch space in a turn of the wire coil, a pair of fingers carried respectively by said holders and having coil-engaging ends in normal side-by-side relation opposite the coil-engaging end of the anvil and adapted to project into respective pitch spaces of successive turns of the wire coil, said anvil being movable by said front slide toward said fingers to catch therebetween a turn of the wire coil with the coil-engaging ends of the anvil and the fingers projecting into the coil from opposite sides thereof, cooperating adjustable stop means on said front slide and said base member for limiting the advance movement of said anvil toward the fingers, said rear slide being connected to said holders to simultaneously pivot them about their pivot axis to swing said fingers around opposite sides of the anvil to bend the wire coil therearound, cooperating adjustable stop means on said rear slide and said base member for limiting the pivotable movement of the said holders and fingers by said rear slide, and common actuating means for said slides comprising a lever pivoted on said base member, connection means comprising a slip friction clutch operatively connecting the lever to the front slide for transmitting advance movement of said lever to the front slide to advance the anvil toward the fingers, and a pin and slot connection between said lever and the rear slide for transmitting advance movement of said lever to said rear slide to pivot the holders and swing the fingers around the anvil only after the latter has been advanced approximately to its limiting advanced position as determined by the interengagement of said stop means for the front slide.

DOROTHY J. ISAAC,
*Administratrix of the Estate of Elmer B. Isaac, deceased.*

FRANCIS J. RIPPL.

REFERENCES CITED

The following references are of record in the file of this patent:

UNITED STATES PATENTS

| Number | Name | Date |
|---|---|---|
| 243,723 | Pierce | July 5, 1881 |
| 447,405 | Goldner | Mar. 3, 1891 |
| 629,412 | Wuelfing | July 25, 1899 |
| 1,591,833 | Jarman | July 6, 1926 |
| 1,726,480 | Fehse | Aug. 27, 1929 |
| 2,078,828 | Baer | Apr. 27, 1937 |
| 2,089,055 | Flaws | Aug. 3, 1937 |
| 2,424,643 | Williams | July 29, 1947 |

FOREIGN PATENTS

| Number | Country | Date |
|---|---|---|
| 7,596 | Great Britain | Mar. 30, 1907 |